United States Patent
Shi et al.

(10) Patent No.: US 11,353,579 B2
(45) Date of Patent: Jun. 7, 2022

(54) METHOD FOR INDICATING OBSTACLE BY SMART ROADSIDE UNIT

(71) Applicant: BAIDU ONLINE NETWORK TECHNOLOGY (BEIJING) CO., LTD., Beijing (CN)

(72) Inventors: Yifeng Shi, Beijing (CN); Xing Hu, Beijing (CN); Huo Cao, Beijing (CN); Haisong Wang, Beijing (CN); Ji Tao, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 350 days.

(21) Appl. No.: 16/554,759

(22) Filed: Aug. 29, 2019

(65) Prior Publication Data
US 2020/0072968 A1    Mar. 5, 2020

(30) Foreign Application Priority Data
Aug. 31, 2018   (CN) .......................... 201811008362.X

(51) Int. Cl.
*G01S 13/931*    (2020.01)

(52) U.S. Cl.
CPC ....... *G01S 13/931* (2013.01); *G01S 2013/932* (2020.01)

(58) Field of Classification Search
CPC .......................... G01S 13/931; G01S 2013/932
See application file for complete search history.

(56) References Cited

U.S. PATENT DOCUMENTS

| | | | |
|---|---|---|---|
| 2015/0187216 A1* | 7/2015 | Kwak | G08G 1/163 |
| | | | 701/24 |
| 2016/0327953 A1* | 11/2016 | Nilsson | B60W 30/16 |
| 2017/0330457 A1 | 11/2017 | Bhalla | |
| 2018/0121763 A1 | 5/2018 | Surnilla et al. | |
| 2019/0236950 A1 | 8/2019 | Li et al. | |

FOREIGN PATENT DOCUMENTS

| | | |
|---|---|---|
| CN | 108010360 A | 5/2018 |
| CN | 108182817 A | 6/2018 |
| JP | 200931241 A | 2/2009 |
| JP | 2011113413 A | 6/2011 |
| JP | 201657677 A | 4/2016 |

OTHER PUBLICATIONS

Office Action for Japanese Application No. 2019133266, dated Jul. 21, 2020, 22 pages.
Extended EP Search Report for EP Application No. 19194292.9, dated Jan. 31, 2020, 7 pages.

* cited by examiner

*Primary Examiner* — Erin F Heard
*Assistant Examiner* — Taher Al Sharabati
(74) *Attorney, Agent, or Firm* — Fay Sharpe LLP

(57) ABSTRACT

Provided are a method for indicating at least one obstacle by a smart roadside unit, a system and a non-temporary computer-readable storage medium. The method includes: detecting the at least one obstacle via a radar to generate an obstacle set; acquiring status information reported by an autonomous vehicle; filtering the obstacle set according to the status information reported by the autonomous vehicle, to remove the autonomous vehicle object from the obstacle set; and sending a filtered obstacle set to the autonomous vehicle.

15 Claims, 3 Drawing Sheets

METHOD FOR INDICATING OBSTACLE BY SMART ROADSIDE UNIT

CROSS-REFERENCE TO RELATED APPLICATION

This application claims priority to and benefits of Chinese Patent Application Serial No. 201811008362.X, filed with the State Intellectual Property Office of P. R. China on Aug. 31, 2018, the entire content of which is incorporated herein by reference.

TECHNICAL FIELD

The present disclosure is related to a method for indicating at least one obstacle by a smart roadside unit.

BACKGROUND

A smart roadside unit may be used in an application such as automatic drive. As requirements for intellectualization of the smart roadside unit increase, a sensing capability of the smart roadside unit should be improved. In order to improve an active sensing capability of the smart roadside unit, the smart roadside unit may be added with different sensing detectors, such as a radar and a camera. Information of obstacles in a certain distance range from the smart roadside unit may be acquired by the radar and the camera, and further sent to a smart autonomous vehicle. The smart autonomous vehicle then can be navigated according to the obstacle information.

SUMMARY

In embodiments of the present disclosure, a method for indicating at least one obstacle by a smart roadside unit is provided, including: detecting the at least one obstacle via a radar to generate an obstacle set; acquiring status information reported by an autonomous vehicle; filtering the obstacle set according to the status information reported by the autonomous vehicle, to remove the autonomous vehicle object from the obstacle set; and sending a filtered obstacle set to the autonomous vehicle.

In embodiments of the present disclosure, a system is provided, including: a processor; a memory storing instructions, in which the instructions when executed by the processor, cause the processor to perform operations, the operations comprising: detecting at least one obstacle via a radar to generate an obstacle set; acquiring status information reported by an autonomous vehicle; filtering the obstacle set according to the status information reported by the autonomous vehicle to remove the autonomous vehicle object from the obstacle set; and sending a filtered obstacle set to the autonomous vehicle.

In embodiments of the present disclosure, a non-temporary computer-readable storage medium is provided, having stored therein computer programs that, when executed by a processor, cause the processor to perform a method for indicating at least one obstacle by a smart roadside unit, the method including: detecting the obstacle via a radar to generate an obstacle set; acquiring status information reported by an autonomous vehicle; filtering the obstacle set according to the status information reported by the autonomous vehicle, to remove the autonomous vehicle object from the obstacle set; and sending a filtered obstacle set to the autonomous vehicle.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
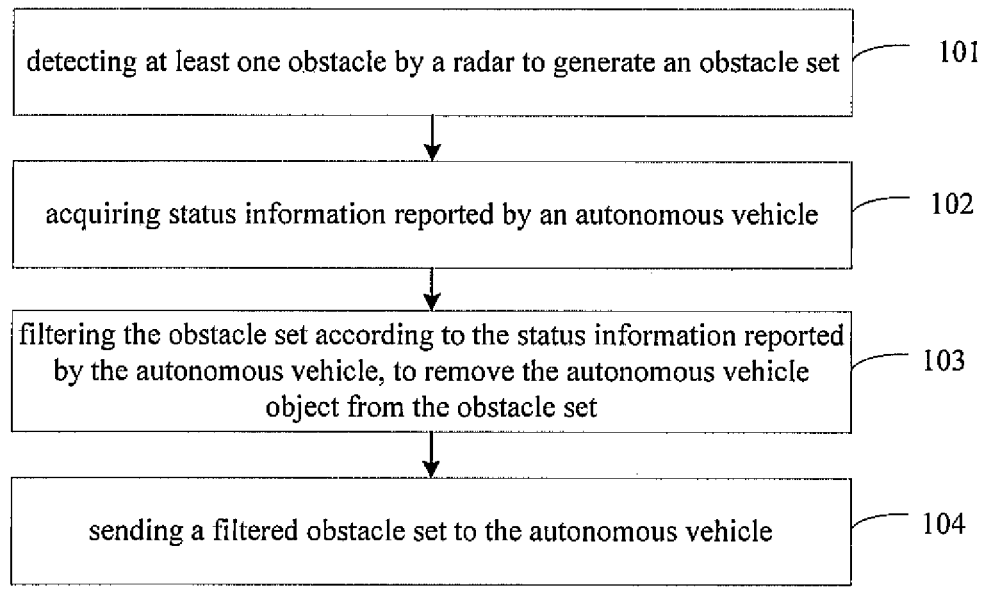
FIG. 1 is a flow chart of a method for indicating at least one obstacle by a smart roadside unit according to an embodiment of the present disclosure.

Reference will be made in detail to embodiments of the present disclosure. The same or similar elements and the elements having same or similar functions are denoted by same or like reference numerals throughout the descriptions. The embodiments described herein with reference to drawings are explanatory, illustrative, and configured to generally understand the present disclosure. The embodiments shall not be construed to limit the present disclosure.

A method for indicating at least one obstacle by a smart roadside unit, a system and a computer device are described below with reference to the accompanying drawings.

FIG. 1 is a flow chart of a method for indicating at least one obstacle by a smart roadside unit according to an embodiment of the present disclosure. As shown in FIG. 1, the method includes following steps.

In block 101, at least one obstacle is detected via a radar to generate an obstacle set.

Figure 2:
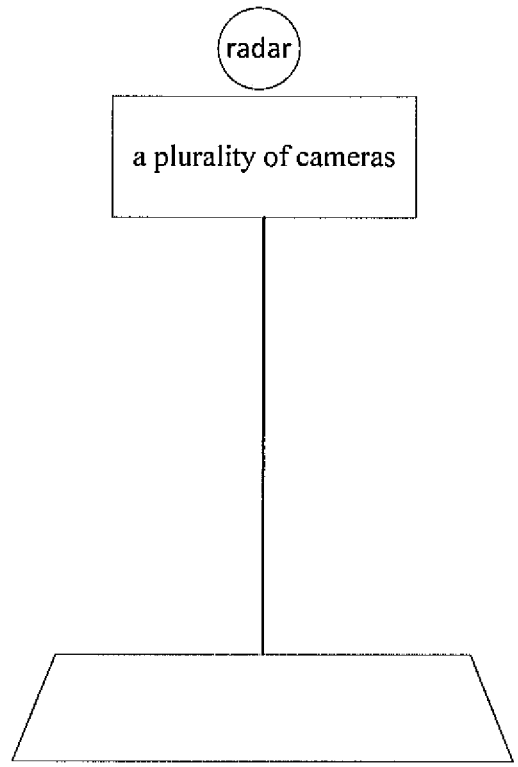
FIG. 2 is a block diagram showing a structure of a smart roadside unit according to an embodiment of the present disclosure.

In an embodiment, the smart roadside unit is provided with a radar and a camera. For example, as shown in FIG. 2, the smart roadside unit includes a radar and a plurality of cameras facing different directions, such that the at least one obstacle may be detected via the radar and the cameras, so as to acquire the information of the at least one obstacle, thus generating the obstacle set before the smart roadside unit sends the obstacle information to the autonomous vehicle.

For example, the at least one obstacle may be detected via the radar and the camera to generate a set of obstacle locations. For another example, the at least one obstacle may be detected via the radar to acquire point cloud data, and thus generating a point cloud image.

Specifically, the radar may be, but not limited to, a laser radar or a microwave radar.

In block 102, status information reported by an autonomous vehicle is acquired.

Specifically, the status information includes, but is not limited to, current location information, volume information and shape information of the autonomous vehicle.

In an embodiment of the present disclosure, current location information reported by the autonomous vehicle can be acquired. For example, the autonomous vehicle may acquire the current location information via the global positioning system (GPS), and then the autonomous vehicle may send the current location information to the smart roadside unit. For another example, the current location information of the autonomous vehicle may be acquired via inertial navigation, and then the autonomous vehicle may send the current location information to the smart roadside unit.

The location information includes, but is not limited to, coordinate information, latitude and longitude information.

In an embodiment of the present disclosure, shape information reported by the autonomous vehicle may be acquired. For example, the shape of the autonomous vehicle is measured and thus the shape information of the autonomous vehicle is generated, and then the autonomous vehicle sends the shape information to the smart roadside unit.

In block 103, the obstacle set is filtered according to the status information reported by the autonomous vehicle to remove the autonomous vehicle object from the obstacle set.

In an embodiment, the location information of the at least one obstacle may be acquired, and the location information of the at least one obstacle is compared with the location information of the autonomous vehicle. If it is determined that an obstacle has a location coinciding with the location of the autonomous vehicle, such an obstacle object is removed from the obstacle set.

In another embodiment, the shape information of the at least one obstacle may be detected, and the shape information of the at least one obstacle is compared with the shape information of the autonomous vehicle. If it is determined that an obstacle has a shape coinciding with the shape of the autonomous vehicle, such an obstacle object is removed from the obstacle set.

It should be noted that filtering the obstacle set as described above may be realized in other suitable ways.

In block 104, a filtered obstacle set is sent to the autonomous vehicle.

In this embodiment, since the autonomous vehicle object itself is removed from the obstacle set before the smart roadside unit sends the filtered obstacle set to the autonomous vehicle, the autonomous vehicle may be navigated according to the obstacle information in a more accurate automatic navigation manner, thus improving the safety and reliability of automatic drive.

In an embodiment of the present disclosure, a plurality of autonomous vehicles may exist and the obstacle set may be filtered respectively. Each filtered obstacle set is sent to the corresponding autonomous vehicle.

With the method for indicating at least one obstacle by the smart roadside unit, the at least one obstacle is detected via the radar to generate the obstacle set, and the status information reported by the autonomous vehicle is acquired. Further, the obstacle set is filtered according to the status information reported by the autonomous vehicle, to remove the autonomous vehicle object from the obstacle set, and the filtered obstacle set is sent to the autonomous vehicle. Therefore, the autonomous vehicle is filtered out from the at least one obstacle in the obstacle set, and the autonomous vehicle can be navigated according to the filtered obstacle information, so as to realize a more accurate automatic navigation, thus improving the safety and reliability of automatic drive.

In an embodiment of the present disclosure, when the status information includes a current location of the autonomous vehicle, the current location of the autonomous vehicle may be further calibrated. The case where the status information includes the current location of the autonomous vehicle is further described as follows.

Figure 3:
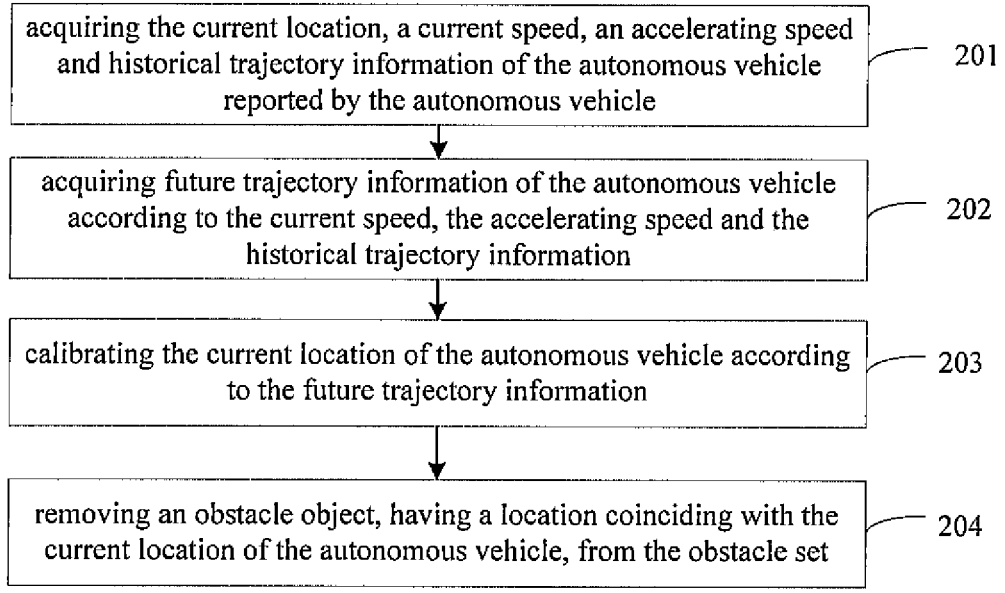
FIG. 3 is a flow chart of a method for indicating at least one obstacle by a smart roadside unit according to another embodiment of the present disclosure.

FIG. 3 is a flow chart of a method for indicating at least one obstacle by a smart roadside unit according to another embodiment of the present disclosure.

As shown in FIG. 3, the method includes following steps.

In block 201, the current location, a current speed, an accelerating speed and historical trajectory information of the autonomous vehicle reported by the autonomous vehicle are acquired.

In an embodiment, the status information further includes the current speed, the accelerating speed and the historical trajectory information of the autonomous vehicle. For example, a speed sensor may acquire the current speed of the autonomous vehicle and an accelerating speed sensor may acquire the accelerating speed of the autonomous vehicle. For another example, the location information of the autonomous vehicle may be acquired in real time, and the historical trajectory information may be generated according to the location information of the vehicle.

In a further embodiment, the autonomous vehicle sends the current speed and the accelerating speed and the historical trajectory information to the smart roadside unit.

Alternatively, direction information of motion of the autonomous vehicle may be acquired by a gyroscope, and the current speed and the accelerating speed of the autonomous vehicle may be vectors.

In block 202, future trajectory information of the autonomous vehicle is acquired according to the current speed, the accelerating speed and the historical trajectory information.

In an embodiment of the present disclosure, a displacement of the autonomous vehicle in a future preset time interval may be acquired according to the current speed and the accelerating speed by a suitable algorithm, and the future trajectory information of the autonomous vehicle may be acquired according to the historical trajectory information, the current location information and the displacement.

For example, a speed v and an accelerating speed a may be calculated according to plane displacement integral, and a displacement s of the autonomous vehicle in a future preset time interval t is acquired. Further, on the basis of current self-location information A and the displacement s of the autonomous vehicle, self-location information B after a duration t is acquired. A trajectory in a further duration t may be acquired according to the self-location information A and B, and such a trajectory is used as well as the historical trajectory information to generate the future trajectory information of the autonomous vehicle.

Specifically, the preset time interval may be acquired by large amount of experimental data, or may be set by a user according to actual requirements, and thus shall not be construed to limit the present disclosure.

In block 203, the current location of the autonomous vehicle is calibrated according to the future trajectory information.

In an embodiment, when the autonomous vehicle acquires the current location, a time stamp for recording this time is also generated, and the time stamp is sent to the smart roadside unit. Further, when the smart roadside unit calibrates the current location of the autonomous vehicle, a current time may be acquired, and the current location of the autonomous vehicle may be calibrated according to the time stamp, the current time and the future trajectory information.

For example, the time stamped by the time stamp is $t_1$, the current time is $t_2$, and the current position sent by the autonomous vehicle is A. Further, on the future trajectory, A is used as a starting point, a location B after a time interval $(t_2-t_1)$ may be acquired as the calibrated current location of the autonomous vehicle.

It should be noted that the calibration of the current location of the autonomous vehicle as described above may be realized in other suitable ways.

It can be understood that there may be a time interval between the time when the autonomous vehicle acquires the current location and the time when the smart roadside unit acquires the obstacle location information. Therefore, the calibrated location may be generated according to the time stamp, the current time and the future trajectory, such that the current location sent by the autonomous vehicle can be calibrated, thus making the location more accurate and further improving the accuracy of filtering the at least one obstacle.

In block 204, an obstacle object having a location coinciding with the current location of the autonomous vehicle is removed from the obstacle set.

For example, the location information of the at least one obstacle may be acquired, and the location information of the at least one obstacle is compared with the calibrated location information of the autonomous vehicle. If it is determined that an obstacle has a location coinciding with the calibrated location of the autonomous vehicle, such an obstacle object is removed from the obstacle set.

With the method for indicating at least one obstacle by the smart roadside unit, the future trajectory information of the autonomous vehicle may be acquired, and the current location of the autonomous vehicle may be calibrated according to the time stamp and the future trajectory information, such that the location is more accurate, thus improving the accuracy of filtering the at least one obstacle and ensuring the safety and reliability of the automatic drive.

Figure 4:
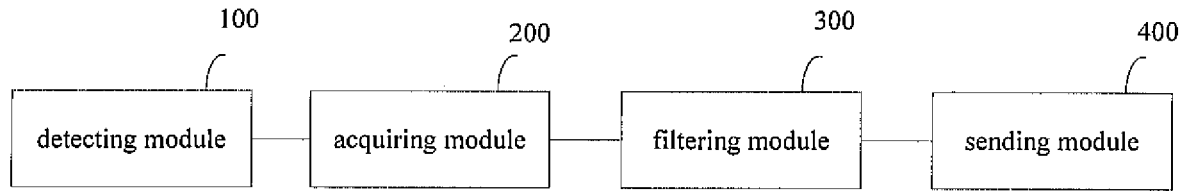
FIG. 4 is a block diagram showing a structure of an apparatus of a smart roadside unit for indicating at least one obstacle according to an embodiment of the present disclosure.

In embodiments of the present disclosure, an apparatus of a smart roadside unit for indicating at least one obstacle is provided. FIG. 4 is a block diagram showing a structure of an apparatus of a smart roadside unit for indicating at least one obstacle according to an embodiment of the present disclosure. As shown in FIG. 4, the apparatus includes a detecting module 100, an acquiring module 200, a filtering module 300, and a sending module 400.

Specifically, the detecting module 100 is configured to detect at least one obstacle via a radar to generate an obstacle set. The acquiring module 200 is configured to acquire status information reported by an autonomous vehicle. The filtering module 300 is configured to filter the obstacle set according to the status information reported by the autonomous vehicle to remove the autonomous vehicle object from the obstacle set. The sending module 400 is configured to send a filtered obstacle set to the autonomous vehicle.

In an embodiment, the status information includes a current location of the autonomous vehicle, and the filtering module 300 is further configured to remove an obstacle object, having a location coinciding with the current location of the autonomous vehicle, from the obstacle set.

Figure 5:
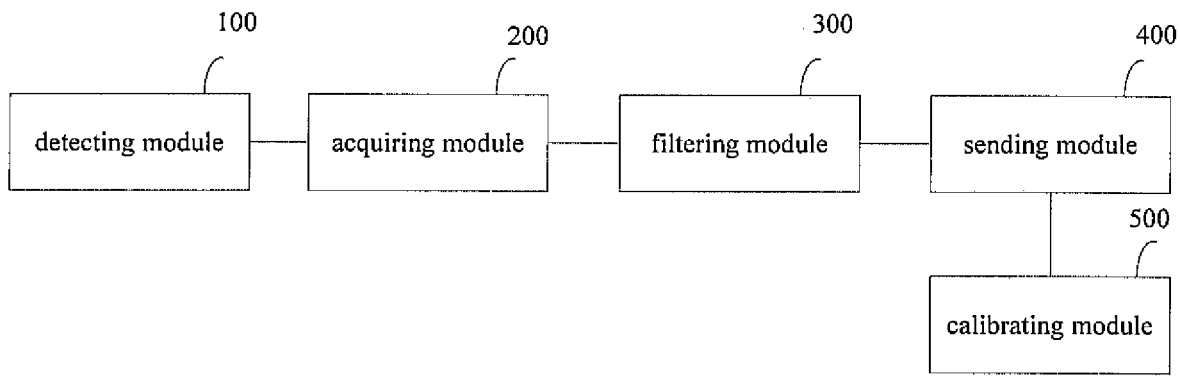
FIG. 5 is a block diagram showing a structure of an apparatus of a smart roadside unit for indicating at least one obstacle according to another embodiment of the present disclosure.

FIG. 5 is a block diagram showing a structure of an apparatus of a smart roadside unit for indicating at least one obstacle according to another embodiment of the present disclosure, and besides the components shown in FIG. 4, the apparatus in FIG. 5 further includes a calibrating module 500.

Specifically, the calibrating module 500 is configured to calibrate the current location of the autonomous vehicle.

In a further embodiment, the status information includes a current speed and an accelerating speed and historical trajectory information of the autonomous vehicle, and the calibrating module 500 is further configured to: acquire future trajectory information of the autonomous vehicle according to the current speed, the accelerating speed and the historical trajectory information; calibrate the current location of the autonomous vehicle according to the future trajectory information.

In a further embodiment, the status information further includes a time stamp, and the calibrating module 500 is further configured to: acquire a current time; calibrate the current location of the autonomous vehicle according to the time stamp, the current time and the future trajectory information.

It should be noted that the explanations of the method for indicating at least one obstacle by the smart roadside unit in the above embodiments are also applicable to the apparatus of the smart roadside unit for indicating at least one obstacle, and details are not described herein again.

With the apparatus of the smart roadside unit for indicating at least one obstacle, the at least one obstacle are detected via the radar to generate the obstacle set, and the status information reported by the autonomous vehicle is acquired. Further, the obstacle set is filtered according to the status information reported by the autonomous vehicle, to remove the autonomous vehicle object from the obstacle set, and the filtered obstacle set is sent to the autonomous vehicle. Therefore, the autonomous vehicle is filtered out from the at least one obstacle in the obstacle set, and the autonomous vehicle can be navigated according to the filtered obstacle information, so as to realize a more accurate automatic navigation, thus improving the safety and reliability of automatic drive.

In an embodiment of the present disclosure, a system is provided, including: a processor; a memory storing instructions, wherein the instructions when executed by the processor, cause the processor to perform operations, the operations including: detecting at least one obstacle via a radar to generate an obstacle set; acquiring status information reported by an autonomous vehicle; filtering the obstacle set according to the status information reported by the autonomous vehicle to remove the autonomous vehicle object from the obstacle set; and sending a filtered obstacle set to the autonomous vehicle.

It should be noted that the explanations of the method for indicating at least one obstacle by the smart roadside unit in the above embodiments are also applicable to the system, and details are not described herein again.

In an embodiment of the present disclosure, a computer device is provided, including a processor; and a memory for storing computer programs executable by the processor; in which the processor is configured to perform a method for indicating at least one obstacle as described above when executing the computer programs.

In an embodiment of the present disclosure, a computer program product is provided, having stored therein instructions that, when executed by a processor, cause the processor to perform a method for indicating at least one obstacle as described above.

In an embodiment of the present disclosure, a non-temporary computer-readable storage medium is provided, having stored therein computer programs that, when executed by a processor, cause the processor to perform a method for indicating at least one obstacle as described above.

Figure 6:
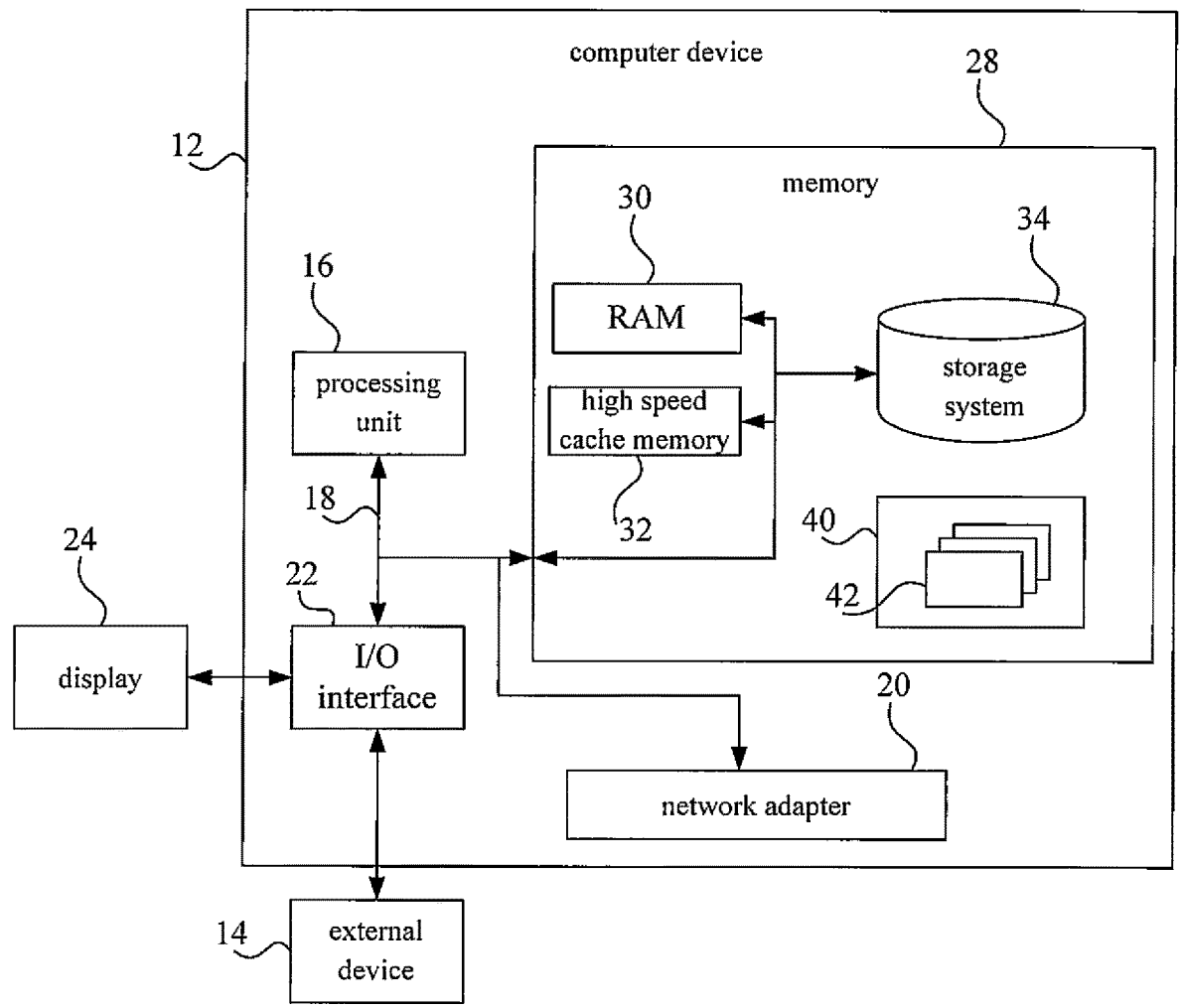
FIG. 6 is a block diagram showing a computer device according to an embodiment of the present disclosure.

FIG. 6 is a block diagram showing a computer device 12 according to an embodiment of the present disclosure. The computer device 12 shown in FIG. 6 is illustrated and shall not be construed to limit the present disclosure.

As illustrated in FIG. 6, the computer device 12 may be represented via a general computer device form. Components of the computer device 12 may be but are not limited to one or more processors or processing units 16, a system memory 28, a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures may be, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (hereinafter referred to as PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory 30 (hereinafter referred to as RAM) and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 6, commonly referred to as a "hard drive"). Although not shown in FIG. 6, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Moreover, the computer device 12 may communicate with one or more networks (such as a local area network (hereafter referred to as LAN), a wide area network (hereafter referred to as WAN) and/or a public network such as an Internet); through a network adapter 20. As shown in FIG. 6, the network adapter 20 communicates with other modules of the computer device 12 over the bus 18. It should be understood that, although not shown in FIG. 6, other hardware and/or software modules may be used in connection with the computer device 12. The hardware and/or software includes, but is not limited to, microcode, device drivers, redundant processing units, external disk drive arrays, RAID systems, Drive and data backup storage system.

The processing unit 16 is configured to execute various functional applications and data processing by running programs stored in the system memory 28, for example, implementing the method for recommending an answer to a question based on artificial intelligence provided in embodiments of the present disclosure.

It should be understood that in this specification, terms such as "first" and "second" are used herein for purposes of description and are not intended to indicate or imply relative importance or significance. Thus, the feature defined with "first" and "second" may include one or more this feature. In the description of the present disclosure, unless specified otherwise, "a plurality of" means two or more than two, for example, two or three.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for indicating at least one obstacle by a smart roadside unit, comprising:

detecting the at least one obstacle via a radar to generate an obstacle set;

acquiring status information reported by an autonomous vehicle, wherein the status information comprises a current location of the autonomous vehicle;

calibrating the current location of the autonomous vehicle;

filtering the obstacle set according to the status information reported by the autonomous vehicle, to remove the autonomous vehicle object from the obstacle set, comprising: removing an obstacle object having a location coinciding with the calibrated current location of the autonomous vehicle from the obstacle set; and sending a filtered obstacle set to the autonomous vehicle.

2. The method according to claim 1, wherein the status information further comprises a volume and a shape of the autonomous vehicle.

3. The method according to claim 2, wherein filtering the obstacle set according to the status information reported by the autonomous vehicle, to remove the autonomous vehicle object from the obstacle set comprises:
   removing an obstacle object, having a location, a volume and a shape coinciding with the calibrated current location, the volume and the shape of the autonomous vehicle, from the obstacle set.

4. The method according to claim 1, wherein the status information further comprises a current speed, an accelerating speed and historical trajectory information of the autonomous vehicle, and
   calibrating the current location of the autonomous vehicle comprises:
   acquiring future trajectory information of the autonomous vehicle according to the current speed, the accelerating speed and the historical trajectory information;
   calibrating the current location of the autonomous vehicle according to the future trajectory information.

5. The method according to claim 4, wherein the status information further comprises a time stamp, and
   calibrating the current location of the autonomous vehicle according to the future trajectory information comprises:
   acquiring a current time;
   calibrating the current location of the autonomous vehicle according to the time stamp, the current time and the future trajectory information.

6. The method according to claim 4, wherein the current speed is acquired by a speed sensor, the accelerating speed is acquired by an accelerating speed sensor, and the historical trajectory information is generated according to location information of the autonomous vehicle.

7. A system, comprising:
   a processor;
   a memory storing instructions, wherein the instructions when executed by the processor, cause the processor to perform operations, the operations comprising:
   detecting at least one obstacle via a radar to generate an obstacle set;
   acquiring status information reported by an autonomous vehicle, wherein the status information comprises a current location of the autonomous vehicle;
   calibrating the current location of the autonomous vehicle;
   filtering the obstacle set according to the status information reported by the autonomous vehicle to remove the autonomous vehicle object from the obstacle set, comprising: removing an obstacle object having a location coinciding with the calibrated current location of the autonomous vehicle from the obstacle set; and
   sending a filtered obstacle set to the autonomous vehicle.

8. The system according to claim 7, wherein the status information further comprises a volume and a shape of the autonomous vehicle.

9. The system according to claim 8, wherein the operations further comprises: removing an obstacle object, having a location, a volume and a shape coinciding with the current location, the volume and the shape of the autonomous vehicle, from the obstacle set.

10. The system according to claim 7, wherein the status information comprises a current speed and an accelerating speed and historical trajectory information of the autonomous vehicle, and the operations further comprises:
    acquiring future trajectory information of the autonomous vehicle according to the current speed, the accelerating speed and the historical trajectory information;
    calibrating the current location of the autonomous vehicle according to the future trajectory information.

11. The system according to claim 10, wherein the status information further comprises a time stamp, and the operations further comprises:
    acquiring a current time;
    calibrating the current location of the autonomous vehicle according to the time stamp, the current time and the future trajectory information.

12. A non-transitory computer-readable storage medium having stored therein computer programs that, when executed by a processor, cause the processor to perform a method for indicating at least one obstacle by a smart roadside unit comprising:
    detecting the obstacle via a radar to generate an obstacle set;
    acquiring status information reported by an autonomous vehicle, wherein the status information comprises a current location of the autonomous vehicle;
    calibrating the current location of the autonomous vehicle;
    filtering the obstacle set according to the status information reported by the autonomous vehicle, to remove the autonomous vehicle object from the obstacle set, comprising: removing an obstacle object having a location coinciding with the calibrated current location of the autonomous vehicle from the obstacle set; and
    sending a filtered obstacle set to the autonomous vehicle.

13. The non-transitory computer-readable storage medium according to claim 12, wherein the status information further comprises a volume and a shape of the autonomous vehicle, and filtering the obstacle set according to the status information reported by the autonomous vehicle, to remove the autonomous vehicle object from the obstacle set comprises:
    removing an obstacle object, having a location, a volume and a shape coinciding with the current location, the volume and the shape of the autonomous vehicle, from the obstacle set.

14. The non-transitory computer-readable storage medium according to claim 12, wherein the status information further comprises a current speed, an accelerating speed and historical trajectory information of the autonomous vehicle, and
    calibrating the current location of the autonomous vehicle comprises:
    acquiring future trajectory information of the autonomous vehicle according to the current speed, the accelerating speed and the historical trajectory information;
    calibrating the current location of the autonomous vehicle according to the future trajectory information.

15. The non-transitory computer-readable storage medium according to claim 14, wherein the status information further comprises a time stamp, and
    calibrating the current location of the autonomous vehicle according to the future trajectory information comprises:
    acquiring a current time;
    calibrating the current location of the autonomous vehicle according to the time stamp, the current time and the future trajectory information.

* * * * *